United States Patent [19]

Lee et al.

[11] Patent Number: 4,616,184

[45] Date of Patent: Oct. 7, 1986

[54] CSAMT METHOD FOR DETERMINING DEPTH AND SHAPE OF A SUB-SURFACE CONDUCTIVE OBJECT

[75] Inventors: David O. Lee; Paul C. Montoya; J. Robert Wayland, Jr., all of Albuquerque, N. Mex.

[73] Assignee: The United States of America as represented by the United States Department of Energy, Washington, D.C.

[21] Appl. No.: 625,321

[22] Filed: Jun. 27, 1984

[51] Int. Cl.$^4$ ............................................. G01V 3/08
[52] U.S. Cl. ................................... 324/335; 324/350; 324/364
[58] Field of Search ............... 324/334, 335, 363, 364, 324/349, 350

[56] References Cited

U.S. PATENT DOCUMENTS

| | | | |
|---|---|---|---|
| 2,573,682 | 11/1951 | Barret | 324/335 |
| 2,731,596 | 1/1956 | Wait et al. | 324/335 |
| 2,991,411 | 7/1961 | Freedman | 324/335 X |
| 4,165,480 | 8/1979 | Morrison | 324/335 X |

OTHER PUBLICATIONS

Wayland, Robert J. "Sandia Heavy Oil Subprogram FY81 Annual Report", Sandia Report SAND 81-2497, Mar. 1982, pp. 63-85.

"Controlled Source AMT" Zonge Engineering and Research Organization, Inc. Publication, Copyright 1982, 8 pages.

*Primary Examiner*—Gerard R. Strecker
*Attorney, Agent, or Firm*—George H. Libman; Albert Sopp; Judson R. Hightower

[57] ABSTRACT

The depth to and size of an underground object may be determined by sweeping a CSAMT signal and locating a peak response when the receiver spans the edge of the object. The depth of the object is one quarter wavelength in the subsurface media of the frequency of the peak.

8 Claims, 3 Drawing Figures

CSAMT METHOD FOR DETERMINING DEPTH AND SHAPE OF A SUB-SURFACE CONDUCTIVE OBJECT

The U.S. Government has rights in this invention pursuant to Contract Number DE-AC04-76DP00789 between the Department of Energy and AT&T Technologies, Inc.

BACKGROUND OF THE INVENTION

The present invention relates generally to a method of detecting underground objects and more particularly to a method using a controlled source audio magnetotelluric signal to detect the depth and shape of a subsurface, electrically conductive, object.

The recovery of heavy oil often necessitates the use of injection wells where steam is forced through the subsurface ground to push heavy oil to production wells where it may be recovered. If the well operator knows where his steam is progressing underground, he can control its distribution by known techniques in order to direct the steam toward his, and away from his neighbors', production wells. One problem is that he often does not know where his steam is progressing underground, with the result that he may be aiding the production of his neighbors' wells. At present, the operator must either drill monitor wells or use geophysical electromagnetic techniques to determine the steam distribution. The monitor wells only give spot information although they quite accurately establish the depth of the steam. The geophysical electromagnetic techniques, e.g., controlled source audio magnetotelluric (CSAMT), can provide on a real time basis an indication of the extent of a steam front, but they give a poor indication of depth.

Electromagnetic sounding techniques have been used for geophysical exploration since the 1930's. These techniques involve the measurement of one or more components of the electric and magnetic fields present in the ground. From these measurements, the apparent resistivity of the ground is calculated and the subsurface nature of the ground inferred from these calculations.

The first magnetotelluric electromagnetic sounding technique used naturally existing ground currents generated by worldwide lightning activity as the current source. Measurements of electric and magnetic field components were made in a broad range of frequencies from about 0.0001 Hz. to 100 Hz. Since lightning did not often provide sufficient signal strength for this method, in the early 1970s the technique of using a fixed electric dipole as a controlled signal source was introduced. A description of the history of this field and the present state of technology is found in "Controlled Source AMT", Zonge Engineering and Research Organization, Inc., Tucson, Ariz., 1982, which is herein incorporated by reference.

This invention utilizes existing CSAMT equipments to provide both the location and depth of underground conductive objects.

SUMMARY OF THE INVENTION

It is an object of this invention to provide a method for determining the location and depth of underground conductive objects.

It is another object of this invention to utilize CSAMT equipment in a unique manner to provide depth information on underground objects.

Additional objects, advantages, and novel features of the invention will become apparent for those skilled in the art upon examination of the following description or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the method for determining from ground surface the size and depth of an underground conductive object may comprise the steps of transmitting a first CSAMT signal at a first location, the frequency of the signal being swept continuously from a low frequency to a higher frequency, and receiving the signal at each of a plurality of receiving stations spaced from the first location. The received signal is then processed to determine the frequency at which a plot of signal magnitude as a function of frequency shows a peak, the peak indicating an underground object at a depth of one quarter wavelength of the transmitted frequency in the subsurface media. The method may preferably also include transmitting a second CSAMT signal into the ground at a second location spaced perpendicular from the first location, and receiving and processing the second signal in a similar manner as the first signal, the first and second locations defining the center of first and second sides of a rectangle containing the underground object.

BRIEF DESCRIPTION OF THE DRAWINGS

The accompanying drawings, which are incorporated in and form a part of the specification, illustrate an embodiment of the present invention and, together with the description, serve to explain the principles of the invention.

DETAILED DESCRIPTION OF THE INVENTION

Figure 1:
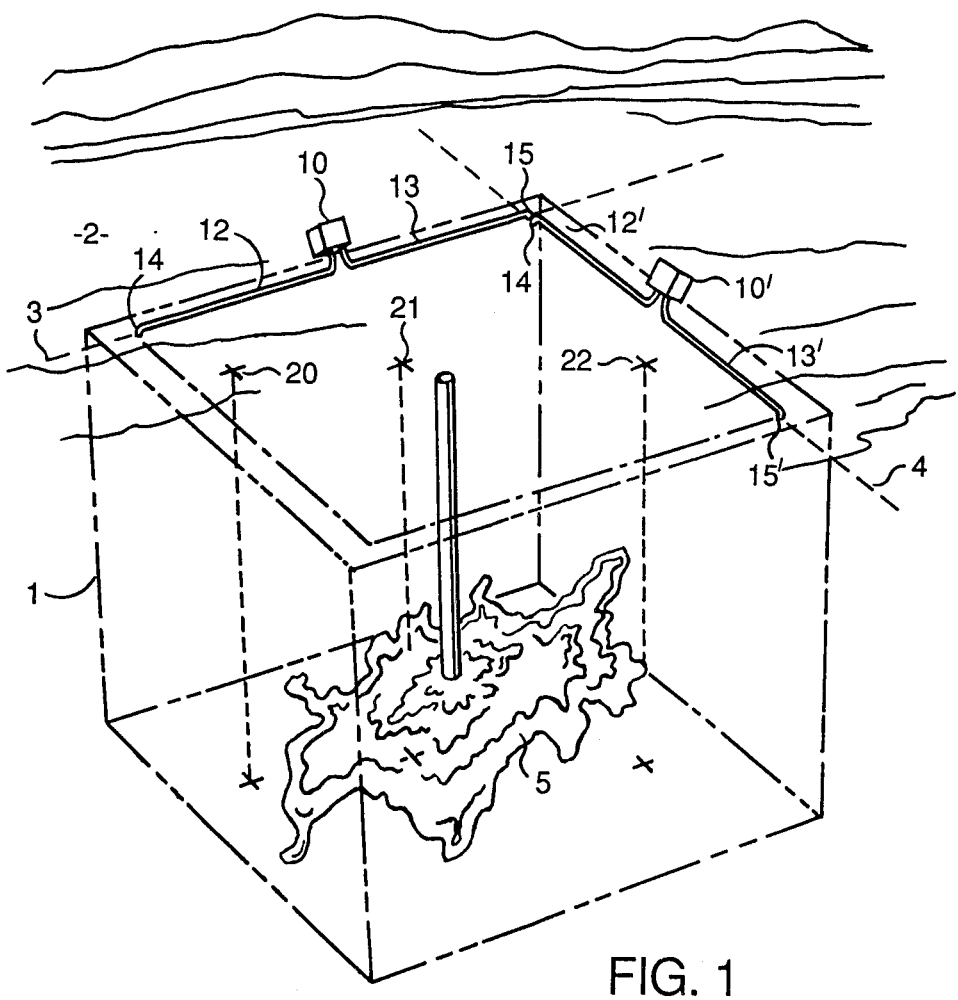
FIG. 1 shows a perspective view of a volume of earth being tested with the invention.

CSAMT mapping is an electromagnetic (EM) technique where a line-varying EM field is generated by driving an alternating current through a wire grounded at both ends. If any inhomogeneity is present in the generated EM field, induced currents will flow in the material. The induced currents generate their own EM fields so that at any point in space the total EM field consists of two parts: a primary field due to the source current and a secondary field due to induced currents in the inhomogeneity.

As is well known in the art, the induced electric field is measured with a much shorter dipole which is established by burying porous pots a few meters apart in the earth. Usually only two components are measured; one parallel and one perpendicular to the transmitting dipole. A magnetometer is used to measure the three components of the magnetic field. All of the equipment needed for these measurements is commercially available from several sources.

The critical factor in applying the CSAMT method is the change in electrical apparent resistivity of the zone under study during a thermal enhanced oil recovery (EOR) process. For a steam flood, the presence of heated water, especially after contamination by formation material, will lower the resistivity of the oil zone. As the high-resistance oil is removed from the zone and replaced with the injected steam/hot water, the resistivity should decrease even further.

The inverse appears to be true for a fire-front EOR process where air or oxygen is pumped into an underground region and in-situ combustion is started. As the fire front moves through a region, some of the in-place oil is first vaporized, and lighter fractions are carried ahead of the front by the combustion gases and the unused injected air. Thus, in front of the fire zone, water from the combustion process and stripped ground water are moved into the formation, resulting in a lower resistivity. Behind the fire zone, the oil and water saturation are almost zero and only the high-resistance rock remains. Just in front of the fire zone, coke is formed and then consumed. The resistivity of the fire front will be variable, depending upon complex combustion chemistry.

Therefore, the signature for a steam drive will conventionally be an apparent low resistivity that rather quickly returns, at the edge of the steam front, to the background resistivity. For a fire flood, the signature will be a zone of high resistivity in the environs of the injection well that changes in a short distance to an area of lower resistivity, with a return to the background resistivity as the fire front moves away from the injection well.

Additional information concerning the theory of CSAMT mapping is available in a report by J. Robert Wayland, "Sandia Heavy Oil Subprogram FY 81 Annual Report", Sandia Report SAND81-2497, January, 1983 which is incorporated herein by reference.

Although CSAMT mapping is useful to determine the presence of an underground conductive object such as a steam front or fire front, until this invention it has not been possible to determine the depth of this object with this method or to clearly define the shape of the object in an unambigious manner.

FIG. 1 shows a preferred embodiment of the practice of a method of this invention. A volume of earth 1 is shown in cutaway perspective to reveal an underground conductive object 5 such as the thermal front associated with a fire or steam front.

Also shown in FIG. 1 is a conventional CSAMT transmitter 10 having a dipole antenna composed of wires 12, 13 extending in opposite directions along a straight line 3 on earth surface 2. End 14 of antenna wire 12 and end 15 of antenna wire 13 are each grounded by conductive spikes (not shown) driven into the ground in a conventional manner. In addition, salt water or organic fluid may be used to improve the connection between ends 14, 15 and ground 1.

Transmitter 10 typically has a square wave output with a repetition rate variable from 4 to 2000 Hz. One significant difference between the transmitter of this invention and prior CSAMT transmitters is that transmitter 10 of the invention provides for sweeping the frequency over the entire range of the transmitter. Most prior CSAMT measurements involved a plurality of discrete binary-related frequencies (for example, 8, 16, 32, 64 ... 1024, 2048 Hz). As is discussed hereinafter, since the depth of an object is related to the wavelength of the transmitted frequency, transmitter 10 must be continuously variable to permit the depth to be determined.

Figure 2:
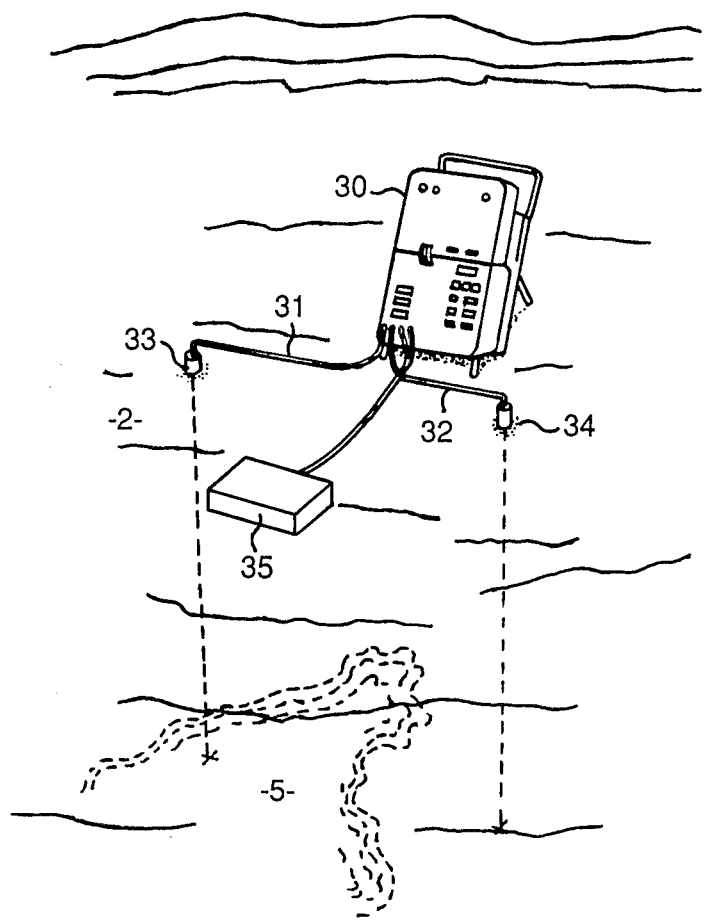
FIG. 2 shows the receiving antenna over an edge of the subsurface object.

For a conventional CSAMT utilization, measurements are taken at a plurality of locations spaced over the volume of earth under study. In FIG. 1, three such locations are shown. Location 20 is not over the conductive underground object being sought, while Location 21 is directly over object 5. Location 22 is selected at the edge of object 5 and is shown in more detail in FIG. 2. In practice, one receiver would be used to make a measurement at each location, the receiver being moved from location to location.

This receiver must measure at least the electric field component parallel to the transmitting dipole ($E_x$) and the perpendicular magnetic field component ($H_y$), but for maximum effectiveness all six components of the electric and magnetic field (EMF) should be measured. A receiver which makes these measurements is a GDP-12 model available from Zonge Engineering. The electric field component is sensed as a potential difference across a dipole 31, 32 several meters long and terminated at both ends 33, 34 by conductive porous pots in contact with ground surface 2. For these measurements, dipole 31, 32 must be oriented to measure specific components of the electric field. The magnetic field is detected by a sensitive, dual-axis, ferrite core antenna 35 placed near the center of dipole antenna 31, 32. The received signals are digitized, stacked and averaged until sufficiently precise data have been obtained. The apparent resistivity in ohm-meters, one of many usable parameters that can be measured, is proportional to the square of one component of the electric field divided by the orthogonal component of the magnetic field, e.g., $E_x$ divided by $H_y$, and inversely proportional to the transmitted frequency. Other useful parameters must be selected from a detailed knowledge of the interaction of the incident EMF and the scattered EMF. Such detail information has been obtained through careful scaled laboratory experiments. These are described in Sandia Internal Memorandum RS6250/84/001 "Development of Experimental and Analytical Models for Controlled Source Audio Magnetotelluric Surveys", March 1984 which is incorporated herein by reference.

Figure 3:
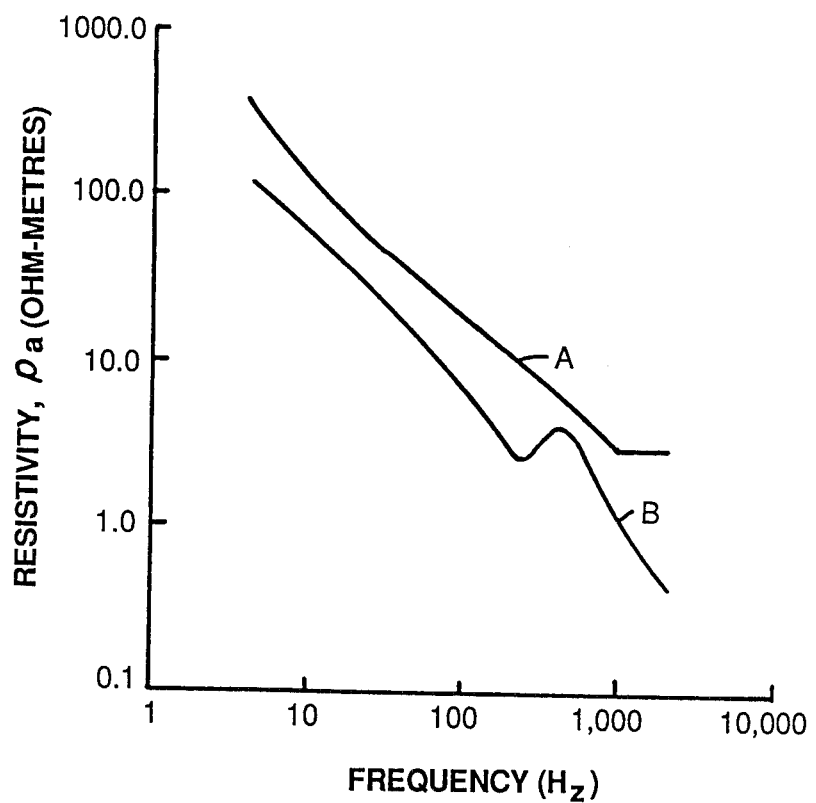
FIG. 3 is a plot of apparent resistivity versus frequency for several locations.

FIG. 3 shows typical curves plotted from measurements of apparent resistivity made over a subsurface pocket of steam injected from well 6. Curve A shows the typical 1/f response which is indicative of not being over the steam. Curve B shows generally lower resistivity which results from receiver 30 being lobated over the conducting steam. In this configuration, there is an abrupt increase in the apparent resistivity in the form of a peak at the frequency (about 500 Hz) which has a wavelength which is four times the depth of the object. In other words, the depth of the object is one-fourth the wavelength at the peak of the frequency in the ground material.

Previous uses of CSAMT techniques did not give the important information of this invention. The normal field practice has been to make CSAMT pseudosections in which the apparent resistivity is plotted on a 2-D graph as a function of depth at a particular frequency at the receiving station. Thus the information given in FIG. 3 is lost or ignored. Actual measurements would involve recording the resistivity for a few discrete frequencies at a number of points at different times. When the resistivity changed, the operators had an indication that underground steam, or a fire front or other conductive object being measured, had reached the measuring location. The B curve of FIG. 3, showing a peak, and taught by this invention to indicate the depth of an edge of the object, was treated as an unknown anomaly and/or ignored if the peak was accidentally discovered in measurements prior to this invention.

As show in FIG. 1, after an initial set of measurements is made with the transmitter 10 in the position shown, the transmitter may be moved to the position shown by transmitter 10' along a line 4 perpendicular to line 3. Dipole antenna 12', 13' are extended along line 4 and are grounded at ends 14' 15' in the manner previously described. For this second set of measurements, receiver 30 would be turned such that dipole 31, 32 would be parallel to line 4. This second set of measurements is not necessary for prior art measurements concerning the presence or absence of an object at a particular location. However, by orienting receiver 30 for the second measurements perpendicular to its orientation for the first measurements, the user has the opportunity to detect edges extending perpendicular to line 4 and parallel to original line 3. The much stronger, and hence cleaner, signals from specific orintiations of the transmitting antenna was not previously known by operators skilled in the CSAMT art. Details on this use of the invention are taught by the laboratory experiments given in RS6250/84/001 and the analysis of the field data used to derive the data in FIG. 3.

In the operation of the method of this invention, transmitter 10 would be set up along an imaginary line 3 as shown in FIG. 1. Receiver 30 would be placed at a first location with antenna 31, 32 parallel to line 3. Transmitter 10 would be actuated, and the frequency swept continuously from a low value to a higher value. Transmitter 30 would then be moved to a second location and the process repeated. After data was obtained from a plurality of points, it could be plotted on site to see if a peak such as shown in curve B of FIG. 3 existed. If such a peak was found, a core-sample or well logs would be analyzed to determine the propagation constants of the signal at that site. This information would then be used to compute the quarter wavelength value indicative of the depth of the object. A second series of measurements could also be made with the transmitter at position 10' and receiver 30 turned parallel to this new position to give depth readings for the front and swept volume extending toward line 3.

The particular equipments discussed above are cited merely to illustrate a particular embodiment of the invention. It is contemplated that the use of this invention may involve different components as long as the principle, sweeping a CSAMT signal to determine the frequency where a peak signal is received indicating an underground conductive object at a depth of one quarter wavelength of the frequency, is followed. Use of this method will provide an accurate method of determining the depth to and size of a subsurface object from the surface. It is intended that the scope of the invention be defined by the claims appended hereto.

We claim:

1. A method for determining from ground surface the size and depth of an underground conductive object, said method comprising the steps of:
   transmitting a first CSAMT signal into the ground at a first location, the frequency of said signal being swept continuously from a low frequency to a higher frequency;
   receiving said first CSAMT signal at each of a plurality of receiving locations spaced from said first location; and
   determining the frequency at which a plot of apparent resistivity at any location as a function of frequency indicates an abrupt increase in apparent resistivity in the form of a peak; and
   determining the depth of the underground object from the frequency at which said peak occurs; said depth being equal to one-fourth the wavelength in the ground material at said frequency.

2. The method of claim 1 wherein said transmitted signals are square waves having a repetition rate that is swept from 4 to 2,000 Hz.

3. The method of claim 2 comprising the additional steps of:
   transmitting a second CSAMT signal into the ground at a second location spaced from said first location and to the side of said receiving locations, the frequency of said second signal being swept continuously from a low frequency of higher frequency;
   receiving said second CSAMT signal at each of said receiving locations; and
   determining the frequency at which a plot of apparent resistivity at any location as a function of frequency indicates an abrupt increase in apparent resistivity in the form of a peak, and determining the depth of the underground object from the frequency at which said peak occurs, said second signal permitting a three-dimensional survey of an area of ground having the center of each of two adjoining sides defined by the locations of said first and second CSAMT transmitters.

4. The method of claim 3 wherein each CSAMT signal is transmitted from an elongate dipole antenna having grounded ends, said antenna being placed along the side of the square defined by the location of its respective transmitter.

5. The method of claim 4 wherein each signal is received on an elongate dipole antenna terminated at both ends by conductive means in contact with the ground, said antenna being placed parallel to the transmitting antenna.

6. The method of claim 5 wherein each said transmitting antenna is over 700 meters long and each said receiving antenna is between 10 and 150 meters long.

7. The method of claim 3 wherein the ends of each dipole define the length of each respective side of the area of ground.

8. The method of claim 7 wherein the area of ground defines a square.

* * * * *